(12) United States Patent
Khanarian et al.

(10) Patent No.: US 8,050,526 B2
(45) Date of Patent: Nov. 1, 2011

(54) MICRO-OPTICAL DEVICE AND METHOD OF MAKING SAME

(75) Inventors: Garo Khanarian, Princeton, NJ (US); Margaret M. Pafford, Langhorne, PA (US); David Sherrer, Blacksburg, VA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/335,722

(22) Filed: Jan. 19, 2006

(65) Prior Publication Data

US 2006/0174652 A1    Aug. 10, 2006

Related U.S. Application Data

(60) Provisional application No. 60/650,948, filed on Feb. 8, 2005.

(51) Int. Cl.
    *G02B 6/26*        (2006.01)
(52) U.S. Cl. ......................................................... 385/52
(58) Field of Classification Search .................. None
    See application file for complete search history.

(56) References Cited

U.S. PATENT DOCUMENTS

| | | | |
|---|---|---|---|
| 4,252,415 A * | 2/1981 | Klein et al. ................... | 349/190 |
| 4,789,214 A | 12/1988 | Vilhelmsson et al. | |
| 4,875,750 A | 10/1989 | Spaeth et al. | |
| 4,945,400 A | 7/1990 | Blonder et al. | |
| 5,066,090 A | 11/1991 | Mayerhofer et al. | |
| 5,181,216 A | 1/1993 | Ackerman et al. | |
| 5,255,333 A | 10/1993 | Althaus et al. | |
| 5,737,466 A | 4/1998 | Honsberg et al. | |
| 5,771,323 A | 6/1998 | Trott | |
| 6,357,098 B1 | 3/2002 | Berg et al. | |
| 6,404,942 B1 | 6/2002 | Edwards et al. | |
| 6,453,090 B1 | 9/2002 | Conde et al. | |
| 6,507,446 B2 * | 1/2003 | Yamashita et al. ............ | 359/811 |
| 6,618,118 B2 | 9/2003 | Minnaert et al. | |
| 7,186,659 B2 | 3/2007 | Fujimoto et al. | |
| 2003/0174407 A1 | 9/2003 | Hammond | |
| 2004/0264866 A1 | 12/2004 | Sherrer et al. | |
| 2005/0110157 A1 | 5/2005 | Sherrer et al. | |
| 2005/0111797 A1 | 5/2005 | Sherrer et al. | |
| 2006/0157274 A1 * | 7/2006 | Stark .............................. | 174/564 |

FOREIGN PATENT DOCUMENTS

| | | |
|---|---|---|
| JP | 5217836 | 8/1993 |
| JP | 06-067069 | 3/1994 |
| JP | 07-151940 | 6/1995 |
| JP | 08-211204 | 8/1996 |
| JP | 2002-289727 | 10/2002 |
| JP | 2004-354647 | 12/2004 |

OTHER PUBLICATIONS

Extended European Search Report of corresponding European Application No. 06 25 0481 dated Apr. 28, 2006.
Search Report for corresponding Taiwanese Patent Application No. 095103015 completed May 5, 2007.
Patent Abstract of Taiwan Publication No. TW530334B; Publication Date: May 1, 2003; English language Equivalent: U.S. Patent No. 6,618,118.
Patent Abstract of Taiwan Publication No. TW412649B; Publication Date: Nov. 21, 2000; English language Equivalent: U.S. Patent No. 6,404,942.

* cited by examiner

*Primary Examiner* — Sung Pak
(74) *Attorney, Agent, or Firm* — Sughrue Mion, PLLC

(57) ABSTRACT

A method for making a micro optical device includes providing an optical element, providing a glass perform, providing a substrate with a precision formed feature designed to passively position the optical element relative to the substrate, and bonding the optical element to the substrate using the glass perform. The optical element is passively located in a predefined relationship with the substrate, and the glass perform has a shape prior to contacting the substrate that is maintained before the bonding.

20 Claims, No Drawings

MICRO-OPTICAL DEVICE AND METHOD OF MAKING SAME

This application claims the benefit of U.S. Provisional Application No. 60/650,948, filed on Feb. 8, 2005.

The present invention relates to micro-optical devices and methods of making the same. More particularly, the present invention relates to micro-optical devices including passive alignment features and methods of making the same.

Every day, more and more applications use micro-optical devices to enhance performance, reduce size, or reduce cost. The demand for volume deployment of micro-optical devices continues to soar.

One disadvantage of commercial micro-optical device designs is that they tend to be costly to fabricate because they require active alignment to achieve the requisite high precision. Another disadvantage is that it is time consuming to assemble components of the micro-optical devices with the requisite alignment tolerances, thus causing low throughput. Considerable time and care may be needed for alignment and adjustment during assembly of the micro-optical devices. This prevents mass production of the micro-optical devices by operators having a moderate level of skill while maintaining the required alignment criteria. These factors limit the cost effectiveness of such micro-optical devices.

Yet to advance the adoption and use of such devices, the ability to manufacture micro-optical devices efficiently is important. Of particular importance is reducing the cost of micro-optical devices, a large portion of which (up to 75%) may be attributable to packaging costs.

One approach to packaging micro-optical devices is disclosed in U.S. Pat. No. 5,771,323 to Trott. Trott discloses an optical submount and a method of making the same comprising:

a substrate;
a precision-formed cavity with sloping walls in the substrate, wherein the cavity is a substantially pyramidal cavity;
a photonics device mounted on the substrate at a predefined distance from the cavity with its optical axis aligned with a diagonal of the cavity; and,
a spherical lens confined by the side walls of the cavity in a predefined relationship with the photonics device without light beam obstruction.

Trott further teaches bonding of the spherical lens in the pyramidal cavity subsequent to seating of the lens in the cavity. By adding the bonding agent subsequent to the seating of the lens, Trott ensures that the bonding agent does not interfere with the mechanical contact between the spherical lens and the pyramidal cavity required to facilitate the passive alignment of the spherical lens on the substrate. The bonding agents taught by Trott include glue and epoxy.

Note that although it is possible to passively align optical elements on substrates with good long term dimensional stability with glue and epoxy, such bonding materials may present a problem in many applications. That is, epoxy adhesives may move or deform during subsequent processing of the substrate. Epoxy adhesives may also move or deform due to temperature excursions or other environmental factors experienced during normal operation of the product. For example, when making a solder connection to the substrate, the cured adhesive can be raised to a temperature of 320° C. to 350° C. This may cause the position of the secured optical element to shift, thus degrading the performance of the device. In addition, glue and epoxy adhesives tend to evolve gasses during and after the curing process. Such evolved gasses can cause degradation in the performance of the device.

Accordingly, there remains a need for cost effective micro-optical device configurations and methods of making the same such as those described herein.

In one aspect of the present invention, there is provided a micro-optical device comprising:
  a first optical element,
  a second optical element,
  a substrate having at least one precision formed feature designed to passively align the first optical element with the second optical element,
  at least one glass preform at least partially disposed between the first optical element and the substrate;
wherein the first optical element is in optical alignment with the second optical element and wherein the at least one glass preform is not substantially disposed within an optical path optically connecting the first optical element with the second optical element.

In another aspect of the present invention, there is provided a method for making a micro-optical device, comprising:
  providing an optical element;
  providing a glass preform;
  providing a substrate having a precision formed feature designed to passively position the optical element relative to the substrate;
  optionally, raising the temperature of the glass preform; and,
  bonding the optical element to the substrate using the glass preform;
wherein the optical element is passively located in a predefined relationship with the substrate and wherein the optical element is not a fiber optic.

In another aspect of the present invention, there is provided a method for making a micro-optical device, comprising:
  providing a first optical element;
  providing a second optical element;
  providing a glass preform;
  providing a substrate with at least one precision formed feature designed to passively align the first optical element and the second optical element;
  raising the temperature of the glass preform; and,
  bonding the first optical element and the second optical element to the substrate, wherein at least the first optical element is bonded to the substrate using the glass preform.

All ranges defined herein are inclusive and combinable.

The term "active alignment" as used herein and in the appended claims means aligning of components with some feedback indication whether adjustment is needed.

The term "not substantially disposed within the optical path" as used herein and in the appended claims means that the glass preform occupies less than a 100% cross section of the optical path between optical elements; alternatively, less than a 75% cross section of the optical path between the optical elements; alternatively, less than a 50% cross section of the optical path between the optical elements; alternatively, less than a 40% cross section of the optical path between the optical elements; alternatively, less than a 30% cross section of the optical path between the optical elements; alternatively, less than a 25% cross section of the optical path between the optical elements; alternatively, less than a 10% cross section of the optical path between the optical elements; alternatively, less than a 5% cross section of the optical path between the optical elements; alternatively, wherein the glass preform is completely absent from the optical path.

In some embodiments, the micro-optical device of the present invention may be selected from an optical platform, a waveguiding platform, an optical subassembly, a silicon optical bench, an optoelectronic platform and a transistor-outline (TO) can optoelectronic subassembly.

In some embodiments, the micro-optical device of the present invention may be an active photonics device. In some aspects of this embodiment, the micro-optical device may be an active photonics device selected from a transmitter, a receiver, a modulator, an attenuator, a switch, an amplifier pump and a semiconductor optical amplifier.

In some embodiments, the micro-optical device of the present invention may be a passive photonics device. In some aspects of this embodiment, the micro-optical device may be a passive photonics device selected from a wavelength division multiplexer, a wavelength division demultiplexer, a filter, a polarizer, an isolator, a coupler, a power splitter, a waveguide and a fiber bragg grating.

In some embodiments, the micro-optical device of the present invention may be a photonics device selected from a semiconductor laser, a semiconductor photo detector, an amplifier, a tunable laser, an etalon, a tunable etalon, a modulator, a compensator, a filter and a switch.

In some embodiments, the micro-optical device may be a CCD, an imaging system, a silicon photonic integrated circuit, an optical scanner, an endoscopic probe or system, an optical data storage subassembly and an optical probe for biological, chemical or medical applications.

In some embodiments, the micro-optical device of the present invention may be a microoptelectromechanical system (MOEMS) device. In some aspects of this embodiment, the micro-optical device may be a MOEMS actuator or optical switch.

In some embodiments, the micro-optical device of the present invention may comprise a substrate that passively aligns one or more optical lenses with a hybridly integrated active or passive optical waveguide such as a photonic integrated circuit, active gain medium, SOI waveguide, laser, photodetector or similar device.

In some embodiments, the substrate may be an optical platform or an optical bench.

In some embodiments, the substrate may contain one or more regions of integrated optical waveguides or photonic crystals.

In some embodiments, the substrate may be a chip. In some aspects, the substrate may be an integrated chip. In some aspects, the substrate may be an integrated optical chip.

Substrates suitable for use with the present invention may be produced from a variety of materials including, for example, polymers, ceramics, metals, dielectric coated metals, glass filled plastics and combinations thereof; alternatively, ceramics, metals, dielectric coated metals, glass filled plastics and liquid crystalline polymers (LCPs).

In some embodiments, the substrate of the present invention may be produced from a semiconductor including, for example, GaAs, InP, Si—Ge, silicon, and doped and alloyed forms thereof. In some aspects of this embodiment, the substrate may be produced from crystalline silicon. In some aspects of this embodiment, the substrate be produced from micro-molded or micro-machined ceramics.

In some embodiments, the substrate of the present invention may be produced from a metal or a ceramic coated metal.

In some embodiments, the substrate of the present invention may be produced from glass. In some aspects of this embodiment, the substrate may be produced from transparent glass.

The substrates of the present invention may, for example, be molded; micro-machined with tolerances of 0.1 μm to 25 μm, alternatively with tolerances of 0.1 μm to 5 μm; chemically etched; photonically etched, e.g., using lithographic techniques and/or stamped using known techniques.

In some embodiment, the substrates of the present invention may be produced from monocrystalline silicon. The use of monocrystalline silicon for the substrate may enable the exploitation of many well-known techniques for shaping semiconductor pieceparts and for depositing metals thereon. Also, there is a variety of commercial equipment in existence that may be utilized to produce the devices of the present invention using such techniques.

The precision formed features created in or on the substrates of the present invention provide a high degree of alignment precision between the optical element seated in or on the substrate and the substrate. In some embodiments, the precision formed features provide a high degree of alignment precision and optical coupling efficiency between two or more optical elements seated in or on the substrate. Given the precision of the precision formed features, the optical element(s) may be seated in a precise three dimensional location on the substrate without the need for active alignment. This enables passive alignment of the optical elements to the substrate (and in certain embodiments to each other) with a great deal of accuracy and precision. It also enables the production of a large number of the micro-optical devices using batch processing techniques, thus significantly reducing the costs of fabrication. Accordingly, given the teachings provided herein, one skilled in the art will recognize that the instant invention permits the assembly of micro-optical devices to extremely close tolerances by relatively unskilled operators in a manner that is consistent with, and amenable to, mass production techniques.

Precision formed features suitable for use with the present invention include, for example, cavities, pits, vias, through holes, grooves, channels, trenches, ledges, mesas, pedestals, cups and combinations thereof.

In some embodiments, the substrate of the present invention exhibits a precision formed feature, wherein the precision formed feature is a cavity. In some aspects of this embodiment, the substrate may exhibit a precision formed feature, wherein the precision formed feature is a cavity selected from a quadrilateral pyramidal cavity, a truncated quadrilateral pyramidal cavity, a conical cavity, a truncated conical cavity and a cylindrical cavity. In some aspects of this embodiment, the substrate may exhibit a precision formed feature, wherein the precision formed feature is a truncated quadrilateral pyramidal cavity.

In some embodiments, the substrate of the present invention exhibits a precision formed feature, wherein the precision formed feature is a cavity. In some aspects of this embodiment, the substrate may exhibit a precision formed feature, wherein the precision formed feature is a cavity selected from at least a portion of a quadrilateral pyramidal cavity, at least a portion of a truncated quadrilateral pyramidal cavity, at least a portion of a conical cavity, at least a portion of a truncated conical cavity and at least a portion of a cylindrical cavity. In some aspects of this embodiment, a portion of a precision formed feature may be formed by dicing off a portion of the substrate. In some aspects of this embodiment, the substrate may exhibit a precision formed feature, wherein the precision formed feature is at least a portion of a truncated quadrilateral pyramidal cavity with at least two sloping side walls. In some aspects of this embodiment, the precision formed feature may be a portion of a truncated quadrilateral pyramidal cavity which exhibits at least two sloping side walls; alternatively which exhibits at least three sloping side walls.

In some embodiments, the substrate of the present invention exhibits a precision formed feature, wherein the precision formed feature is selected from at least one groove, at least one channel and a combination of at least one groove and at least one channel.

In some embodiments, the substrate of the present invention may be made of crystalline silicon with a precision formed cavity that is a pyramidal cavity with sloping side walls formed by masking and anisotropicly etching a predefined area so as to have the side walls of the pyramidal cavity predominantly located along the crystallographic planes of the substrate.

In some embodiments of the present invention, the glass composition used to prepare the glass preform may exhibit a melting point temperature of less than 500° C.; alternatively less than 480° C.; alternatively less than 450° C.; alternatively less than 425° C.; alternatively less than 400° C.; alternatively less than 375° C.; alternatively less than 350° C.; alternatively less than 325° C.; alternatively less than 300° C.; alternatively less than 250° C.; alternatively less than 200° C.; alternatively less than 150° C.; alternatively between 120° C. and 400° C.

In some embodiments of the present invention, the glass composition used to prepare the glass preform may exhibit a softening point temperature of 100° C. to 350° C.; alternatively 150° C. to 300° C.; alternatively 200° C. to 250° C. In some embodiments of the present invention, the glass composition used to prepare the glass preform may exhibit a glass transition temperature of between 85° C. and 320° C.; alternatively 150° C. to 300° C.; alternatively 175° C. to 275° C.; alternatively 200° C. to 250° C.

Advantageously, the glass preform provides a relatively strong bond between the optical element and the substrate.

One skilled in the art will know to select the glass composition for use in preparing the glass preform to provide a thermal expansion coefficient, viscosity, adhesive characteristics and melting point within a desired range for a given device application. The selection of softening and melting points of a given glass preform may enable a series of bonds to be formed in relatively close proximity to each other on a given substrate, provided the melting point of each successive bond is sufficiently below the temperature at which the earlier bond(s) soften. The formation of a series of bonds in the vicinity of each other is further enhanced when localized heating is used to melt the glass preforms forming the bonds. In some embodiments, localized heating of the glass preforms may result in less thermal stress on earlier bonds formed on the substrate. This results in an increased ability of the bonds to withstand subsequent shock and vibration.

In some embodiments, the glass preforms of the present invention may comprise:
one or more network formers;
optionally, one or more network modifiers;
optionally, one or more insoluble particulate fillers; and,
optionally, one or more negative thermal expansion modifiers.

In some embodiments, the glass preforms may comprise a mixture of network formers. Mixtures of network formers suitable for use with the present invention may include, for example, binary and ternary glass systems. Binary and ternary glass systems suitable for use with the present invention include, for example, $PbO/Bi_2O_3/B_2O_3$; $PbO/ZnO/B_2O_3$; $PbO/V_2O_5$; $TeO_2/V_2O_5/(AgO_2/P_2O_5)$; $SnO/P_2O_5$ and $AgO/P_2O_5$.

Network modifiers suitable for use with the present invention may be soluble or partially soluble in the one or more network formers. Network modifiers may function to alter various properties of the glass preform, for example, its adhesive strength and/or its flowability. Network modifiers suitable for use with the present invention may include, for example, $WO_3$, fluorine, silver oxide, $Bi_2O_3$, PbO, ZnO, SnO, $B_2O_3$, $MoO_3$, $Li_2O$, BaO, $TeO_2$, $Ta_2O_5$, $Na_2O$, $P_2O_5$, $Fe_2O_3$, CuO, $Cs_2O$, $Sb_2O_3$, $As_2O_3$ and CdO. In some embodiments, the glass preforms of the present invention may comprise 0 to 10 wt % network modifiers; alternatively 0.1 to 10 wt % network modifiers.

Insoluble particulate fillers suitable for use with the present invention may include, for example, refractory silicates, refractory titanates and refractory ceramics made from Group V metal oxides (P, As, Sb, V, Nb, Ta). In some embodiments, the one or more insoluble particulate fillers may be selected from beta-eucryptite, zirconium silicate, cordierite, spodumene, lead titanate. Insoluble particulate fillers may function to alter various properties of the glass preform, for example, its thermal expansion and contraction properties, which may operate to minimize the potential for crack propagation in a solder joint formed using the glass preform. In some embodiments, the glass preforms of the present invention may comprise 0 to 50 wt % insoluble fillers; alternatively, 0.5 to 50 wt % insoluble fillers.

Negative thermal expansion modifiers suitable for use with the present invention may include, for example, zirconium tungstates, zirconium phosphates, and NEX-1 (available from O-Hara Corporation).

In some embodiments, the glass preforms of the present invention are heterogeneous systems. That is, in some embodiments, the glass preforms (both pre- and post-bonded) exhibit (a) micro-domains of (i) one or more at least partially insoluble network modifiers, and/or (ii) one or more insoluble particulate fillers, and/or (iii) one or more negative thermal expansion modifiers; disposed within, (b) one or more network formers.

In some embodiments of the present invention, the glass preform may be selected from a fused frit glass and a glass bead. In some aspects of this embodiment, the glass preform may be selected from a binderless, fused frit glass and a binderless glass bead. In some aspects of this embodiment, the glass preform is a binderless glass bead. Binderless glass beads suitable for use with the present invention may be obtained from a glass composition using processes known in the art such as those disclosed in, for example, U.S. Pat. Nos. 3,493,403 and 4,192,576.

Glass preforms suitable for use with the present invention may exhibit a variety of shapes, including, for example, a polyhedron, an ellipsoid, a torus, a Goursat's surface, a lemon and an amorphous shape. In some aspects of this embodiment, the glass preform may exhibit a shape selected from an ellipsoid, a torus and an amorphous shape. In some aspects of this embodiment, the glass preform may exhibit a shape selected from an ellipsoid and an amorphous shape. In some aspects of this embodiment, the glass preform may exhibit an ellipsoidic shape. In some aspects of this embodiment, the glass preform may exhibit a spherical shape.

In some embodiments of the present invention, the glass preforms may be solid. In some embodiments of the present invention, the glass preforms may contain voids. In some aspects of this embodiment, the glass preforms may be hollow comprising a gas encapsulated by the glass composition of which the glass preform is comprised. In some aspects of this embodiment, the glass preforms may be in the form of an open or closed cell foam.

One skilled in the art, given the teachings of this application, will know to select the shape and mass of the glass preform to cooperate with the precision formed feature and the optical element to facilitate bonding of the optical element to the substrate without interfering with the passive alignment features of the present invention. That is, the glass preform may be of a shape and size such that after bonding, the glass preform does not interfere with the mechanical contact between the optical element and the substrate at the points which operate to precisely position the optical element on the substrate. Ideally, after bonding, no glass preform material should be present at these contact points. Notwithstanding, one skilled in the art will recognize that in some micro-optical devices a minimal amount of glass bonding material may be interposed between an optical element and the substrate at one or more contact points without critically degrading the passive alignment features of the device.

In some embodiments of the present invention multiple glass preforms may be used to adhere an optical element to the substrate.

In some embodiments of the present invention a single glass preform may be used to adhere an optical element to the substrate.

In some embodiments of the present invention, the micro-optical device may further comprise a cap and at least one groove in the substrate, wherein the at least one groove is adapted to receive the cap. In some aspects of this embodiment, the cap may be bonded to the substrate to form a hermetically sealed space containing at least one optical element, wherein the at least one optical element is passively aligned with the substrate and wherein the at least one optical element is bonded to the substrate with at least one glass preform.

In some embodiments of the present invention, the glass preform exhibits a minimal tendency to off-gas. In some aspects of this embodiment, the glass preform exhibits essentially no tendency to off-gas. In some aspects of this embodiment, the glass preform exhibits no tendency to off-gas. This feature of the glass preforms of the present invention is particularly important for at least some embodiments. For instance, in some embodiments the design of the precision formed feature and the shape of the optical element to be seated therein or thereon make the lack of off-gassing tendency a significant advantage. For example, in an embodiment wherein the precision formed feature comprises a conical or cylindrical shape with a circular top edge and the optical element is a spherical lens, there would be no avenue for off-gas to escape from the volume created between the optical element and the substrate containing the glass preform. In some embodiments, hermetic sealing requirements make the lack of off-gassing an advantage. For example, in certain active MEMS devices a constituent of the device vibrates during use. The frequency of the constituent's vibration depends on the atmosphere within the device surrounding the vibrating constituent. Off-gassing from a bonding material could alter the atmosphere within the device causing the frequency of the constituent's vibration to change, potentially resulting in a malfunction of the device.

In some embodiments, the micro-optical device of the present invention comprises:
a first optical element;
a second optical element;
a substrate having at least one precision formed feature designed to passively align the first optical element with the second optical element, wherein the precision formed feature is at least a portion of a truncated quadrilateral pyramidal cavity with at least two sloping side walls, alternatively at least three sloping side walls, alternatively with four sloping side walls;
at least one glass preform at least partially disposed between the first optical element and the substrate;
wherein the first optical element is a ball lens; wherein the ball lens is in direct contact with at least two sloping side walls of the precision formed feature, alternatively, wherein the ball lens is in direct contact with at least three sloping side walls of the precision formed feature, alternatively, wherein the ball lens is in direct contact with four sloping side walls of the precision formed feature; wherein the ball lens is in optical alignment with the second optical element and wherein the at least one glass preform is not substantially disposed within an optical path optically connecting the first optical element with the second optical element.

In some embodiments, the micro-optical device of the present invention comprises:
a first optical element;
a second optical element;
a substrate having at least one precision formed feature designed to passively align the first optical element with the second optical element, wherein the precision formed feature is at least a portion of a truncated conical cavity or at least a portion of a cylindrical cavity, wherein the precision formed feature has at least a portion of a circular top edge or surface;
at least one glass preform at least partially disposed between the first optical element and the substrate;
wherein the first optical element is a ball lens, wherein the ball lens is in direct contact with at least two distinct points on the at least a portion of the circular top edge or surface, wherein the ball lens is in optical alignment with the second optical element and wherein the at least one glass preform is not substantially disposed within an optical path optically connecting the first optical element with the second optical element.

Optical elements suitable for use with the present invention include, for example, opto electrical elements, opto mechanical elements and optics.

Opto electrical elements and opto mechanical elements suitable for use with the present invention include, for example, lasers (e.g., diode lasers and tunable lasers), light emitting diodes, photodiodes, photodetectors, amplifiers, tunable etalons, modulators, compensators, filters, switches, wavelength division multiplexers, wavelength division demultiplexers, isolators, power splitters, waveguides, fiber bragg gratings and polarizers.

Optics suitable for use with the present invention include, for example, optical lens, filters, etalons, couplers, prisms, wavelength division multiplexers, wavelength division demultiplexers and optical fibers. Optical lens suitable for use with the present invention include, for example, cylindrical lens, GRIN lenses, aspheric lens and ball lens.

In some embodiments of the present invention, one or more of the optical elements may comprise a ball lens. Ball lens suitable for use with the present invention may be in the shape of an ellipsoid or any portion of an ellipsoid. In some embodiments, the ball lens may exhibit an ellipsoidic shape selected from, for example, a spheroid and a sphere. In some embodiments, the ball lens may exhibit an ellipsoidic shape selected from, for example, an oblate spheroid and a prolate spheroid. In some embodiments, the ball lens may be an anamorphic lens.

In some embodiments, ball lens suitable for use with the present invention may, for example, exhibit a mean average diameter of 25 μm to 5 mm; alternatively 100 μm to 2 mm; alternatively 100 μm to 1 mm; alternatively 100 μm to 800

μm; alternatively 100 μm to 500 μm; alternatively 100 μm to 400 μm; alternatively less than 400 μm; alternatively less than 300 μm; alternatively less than 250 μm; alternatively less than 225 μm; alternatively less than 200 μm.

In some embodiments of the present invention, the micro-optical device comprises a ball lens and the substrate exhibits a precision formed feature, wherein the precision formed feature is a portion of a truncated quadrilateral pyramidal cavity with at least two sloping side walls and wherein the ball lens is in direct contact with at least two of the sloping side walls.

In some embodiments, the micro-optical device of the present invention may comprise multiple optical elements. In some aspects of this embodiment, the micro-optical device of the present invention may comprise a first optical element and a second optical element. The first optical element and the second optical element may be the same or different. In some aspects of this embodiment, the micro-optical device of the present invention may comprise a first optical element and a second optical element, wherein the first optical element is not a fiber optic. In some aspects of this embodiment, the first optical element and the second optical element are in optical alignment with an optical path optically connecting the first optical element with the second optical element. In some aspects of this embodiment, the at least one glass preform is not substantially disposed within the optical path.

In some embodiments of the present invention, the micro-optical device may include an optical element, wherein the optical element is a fiber optic. In some aspects of this embodiment, the at least one precision formed feature may be selected to receive the fiber optic. For example, the at least one precision formed feature may be selected from, for example, a groove, a channel, a slot and a trench. In some aspects of this embodiment, the at least one precision formed feature may be selected from, for example, a "v"-groove and a "u"-groove.

In the operation of raising the temperature of the glass preform, a source of heat localized to the vicinity of the desired bond between the optical element and the substrate may be provided to raise the temperature of the glass preform. In some embodiments, the temperature of the glass preform may be raised above the glass transition temperature thereof. In some embodiments, the temperature of the glass preform may be raised above the softening point temperature thereof. In some embodiments, the temperature of the glass preform may be raised to a point where the glass preform melt flows.

In some embodiments, the temperature of the glass preform may be raised using a laser heater. In some aspects of this embodiment, the laser heating effects may be enhanced by incorporating substances into the glass preform that enhance the absorption of the lasing radiation. For example, carbon black, graphite, black metallic oxides may increase the absorption of $CO_2$, Nd/YAG and semiconductor laser heating sources.

In some embodiment, the temperature of the glass preform may be raised using an induction heater positioned in the vicinity of the desired bond between the optical element and the substrate.

In some embodiments, the glass preform may be heated to a temperature in the range of 120° C. to 480° C. In some embodiments, the glass preform may be heated to a temperature in excess of 200° C. In some embodiments, the glass preform may be heated to a temperature of less than 400° C. In some embodiments, the glass preform may be heated to a temperature of less than 375° C. In some embodiments, the glass preform may be heated to a temperature of less than 350° C. In some embodiments, the glass preform may be heated to a temperature of less than 320° C. In some embodiments, the glass preform may be heated to a temperature of less than 300° C.

In some embodiments of the present invention, the glass preform is located on or in the precision formed feature before the optical element is located on or in the precision formed feature. In some aspects of this embodiment, the temperature of the glass preform may be raised before and/or after the optical element is located on or in the precision formed feature.

In some embodiments of the present invention, a method of making a micro-optical device is provided, comprising:
  providing a first optical element,
  providing a second optical element, wherein the first optical element and the second optical element may be the same or different (for example, both optical elements may be ball lens; one optical element may be a ball lens and the other a laser; etc.);
  providing a glass preform;
  providing a substrate with at least one precision formed feature designed to passively align the first optical element and the second optical element;
  raising the temperature of the glass preform; and,
  bonding the first optical element and the second optical element to the substrate, wherein at least the first optical element is bonded to the substrate using the glass preform.

We claim:
1. A method for making a micro-optical device, comprising:
  providing an optical element;
  providing a glass preform;
  providing a substrate with a precision formed feature manufactured of the substrate and designed to passively position the optical element relative to the substrate; and,
  bonding the optical element to the substrate using the glass preform;
  wherein the optical element is passively located in a predefined relationship with the substrate and wherein the optical element is not a fiber optic,
  wherein the glass preform exhibits a shape prior to contacting the substrate that is maintained at least before said bonding.

2. The method of claim 1, wherein the optical element contacts the precision formed feature at two or more points when bonded to the substrate.

3. A micro-optical device made using the method of claim 1.

4. The micro-optical device of claim 3, wherein the micro-optical device is selected from an optical platform, a waveguiding platform, an optical subassembly, a silicon optical bench, an optoelectronic platform, a transistor-outline (TO) can optoelectronic subassembly, microoptoelectromechanical system (MOEMS) device and a photonics device.

5. A method for making a micro-optical device, comprising:
  providing a first optical element;
  providing a second optical element;
  providing a glass preform;
  providing a substrate with at least one precision formed feature manufactured of the substrate and designed to passively align the first optical element and the second optical element;
  raising the temperature of the glass preform; and, bonding the first optical element and the second optical element to the substrate, wherein at least the first optical element is bonded to the substrate using the glass preform, wherein the glass preform exhibits a shape prior to contacting the substrate that is maintained at least before said bonding at least the first optical element to the substrate.

6. The method of claim 5, wherein the first optical element contacts the precision formed feature at two or more points when bonded to the substrate.

7. A micro-optical device made using the method of claim 5.

8. The micro-optical device of claim 7, wherein the micro-optical device is selected from an optical platform, a waveguiding platform, an optical subassembly, a silicon optical bench, an optoelectronic platform, a transistor-outline (TO) can optoelectronic subassembly, microoptoelectromechanical system (MOEMS) device and a photonics device.

9. A micro-optical device comprising:
a first optical element;
a second optical element;
a substrate having at least one precision formed feature manufactured of the substrate and designed to passively align the first optical element with the second optical element; and,
at least one glass preform at least partially disposed between the first optical element and the substrate, the at least one glass preform exhibiting a shape prior to contacting the substrate that is maintained at least before bonding;
wherein the first optical element is in optical alignment with the second optical element and wherein the at least one glass preform is not substantially disposed within an optical path optically connecting the first optical element with the second optical element.

10. The micro-optical device of claim 9, wherein the precision formed feature is at least a portion of a truncated quadrilateral pyramidal cavity with at least two sloping side walls, wherein the optical element is a ball lens and wherein the ball lens is in contact with at least two of the sloping side walls.

11. The method of claim 1, wherein the glass preform contains voids.

12. The method of claim 1, wherein the glass preform contains a hollow comprising a gas encapsulated by a glass composition composed in the glass preform.

13. The method of claim 1, wherein the glass preform is in the form of an open cell foam or a closed, cell foam.

14. The method of claim 5, wherein the glass preform contains voids.

15. The method of claim 5, wherein the glass preform contains a hollow comprising a gas encapsulated by a glass composition composed in the glass preform.

16. The method of claim 5, wherein the glass preform is in the form of an open cell foam or a closed cell foam.

17. The method of claim 9, wherein the glass preform contains voids.

18. The method of claim 9, wherein the glass preform contains a hollow comprising a gas encapsulated by a glass composition composed in the glass preform.

19. The method of claim 9, wherein the glass preform is in the form of an open cell foam or a closed cell foam.

20. The method of claim 1, wherein the shape comprises at least one of an ellipsoid shape, a torus shape, a polyhedron shape, a Goursat's surface shape, a lemon shape, an amorphous shape, and a spherical shape.

* * * * *